March 4, 1958 E. V. SUNDT 2,825,826
SLOW SPEED ELECTRIC MOTOR
Filed Nov. 6, 1953
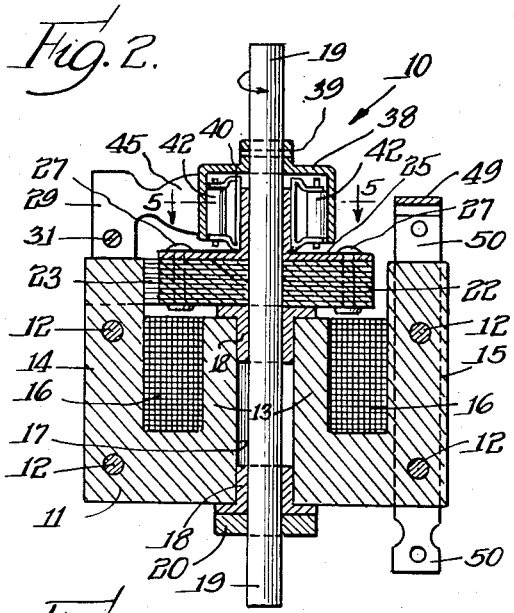
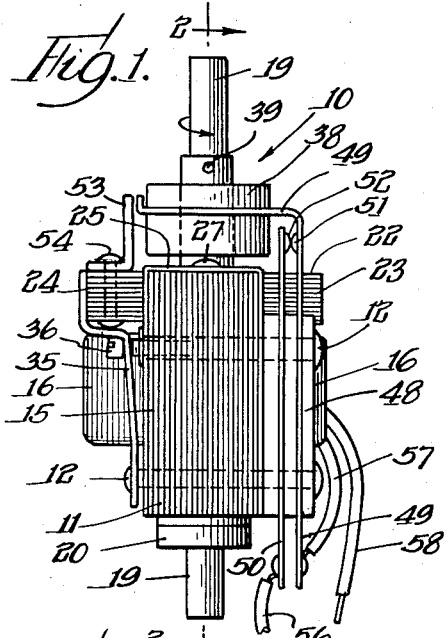
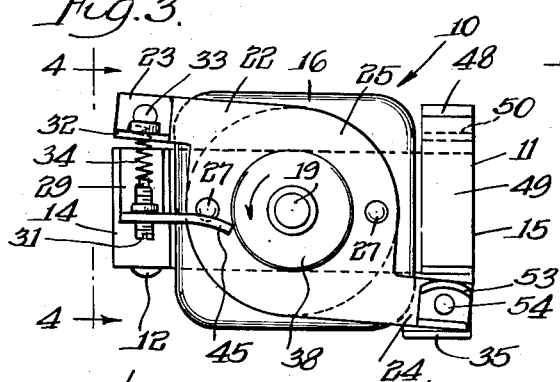
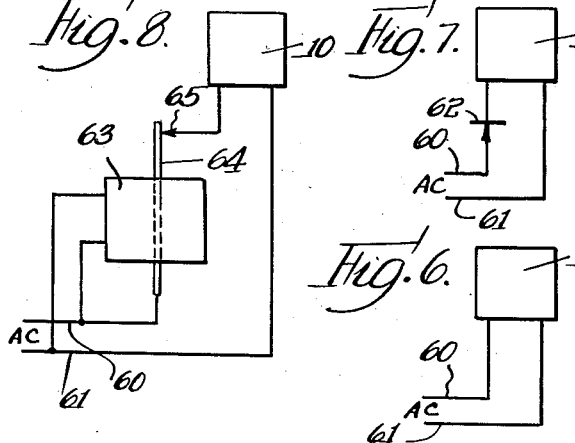
INVENTOR.
Edward V. Sundt
BY
Wallenstein & Spangenberg Attys.

United States Patent Office 2,825,826
Patented Mar. 4, 1958

2,825,826
SLOW SPEED ELECTRIC MOTOR

Edward V. Sundt, Wilmette, Ill., assignor to Sundt Engineering Company, Des Plaines, Ill., a corporation of Illinois Application November 6, 1953, Serial No. 390,609

4 Claims. (Cl. 310—37)

This invention relates to a slow speed electric motor wherein a shaft is positively rotated in one direction at a slow speed without the use of gear reducers or the like.

The principal object of this invention is to provide a slow speed electric motor wherein the shaft is positively rotated in one direction at slow speed, wherein reverse rotation of the shaft is prevented, wherein large torque is provided, wherein the shaft may be rotated at a substantially constant speed, wherein the speed of rotation of the shaft may be regulated, which is simple in construction and inexpensive to manufacture and which is fool proof in operation.

Briefly, the slow speed electric motor of this invention comprises a stationary part including an electro-magnet. A pivoted armature is magnetically coupled to the electro-magnet and oscillated thereby about its pivot. It also includes a rotary shaft suitably journalled for rotation in the stationary part. Means including an over-riding clutch is interposed between the armature and the shaft for positively rotating the shaft in one direction as the armature oscillates. Means including an over-riding clutch is interposed between the shaft and the stationary part for positively preventing rotation of the shaft in the opposite direction. Means including electrical connections for the electro-magnet is provided for applying a pulsating current to the electro-magnet to cause the armature to oscillate and hence the shaft to rotate.

Pulsating current may be applied to the electro-magnet in various ways to cause oscillation of the armature. Uni-directional current can be supplied to the electro-magnet through the electrical connections and an interrupter switch located in the electrical connections. Means located between the armature and the interrupter switch is provided for operating the latter from the former for applying a pulsating direct current to the electro-magnet to cause the armature to operate. As an alternative, alternating current can be applied directly to the electro-magnet to cause the armature to oscillate. In the latter case it is found that better operating results are obtained if a half-wave rectifier is located in the electrical connections for applying a pulsating direct current to the electro-magnet. In the case of alternating current supply, an interrupter switch may also be utilized, this interrupter switch being operated by an electro-mechanical device tuned to the alternating current frequency for applying a pulsating direct current to the electro-magnet.

For obtaining balanced operation and minimum vibration, the electro-magnet may include an E-shaped core having an inner leg and a pair of outer legs with the coil encompassing the inner leg. The rotary shaft is rotatably mounted in the inner leg of the core. The pivoted armature is mounted for oscillation on the rotary shaft and is magnetically coupled to the inner and outer legs of the core and is oscillated thereby as the core is energized.

Further objects of this invention reside in the details of construction of the slow speed electric motor and in the cooperative relationships between the component parts thereof.

Other objects and advantages of this invention will become apparent to those skilled in the art upon reference to the accompanying specification, claims and drawing, in which:

Fig. 1 is a side elevational view of the slow speed electric motor of this invention;

Fig. 2 is a vertical sectional view taken substantially along the line 2—2 of Fig. 1;

Fig. 3 is a top plan view of the slow speed electric motor;

Fig. 4 is a partial elevational view looking from the left of Fig. 3 as indicated by the line 4—4;

Fig. 5 is an enlarged horizontal sectional view taken substantially along the line 5—5 of Fig. 2;

Figs. 6, 7 and 8 illustrate respectively different manners of applying pulsating current to the slow speed electric motor.

The slow speed electric motor of this invention is generally designated at 10. It has a stationary part including an electro-magnet having a core 11. The core 11 is preferably a laminated construction wherein the laminations are held together by rivets 12. Preferably, the core 11 is E-shaped in configuration having an inner leg 13 and a pair of outer legs 14 and 15. A coil 16 is carried by the core 11 and encompasses the inner leg 13. When the coil 16 is energized with a pulsating current, a pulsating magnetic flux is induced in the E-shaped core 11.

The inner leg 13 of the core 11 is centrally provided with a hole 17 in which are fitted bearings 18. A shaft 19 is rotatably mounted in the bearings 18 and the shaft is held against longitudinal movement in one direction by means of a collar 20 suitably secured thereto.

A pivoted armature 22 having a central hole is mounted for rotation on the shaft 19. The armature 22 is also a laminated construction wherein the laminations are held together by rivets 27. The armature 22 overlies the inner leg 13 and is provided with a pair of extensions 23 and 24 in lateral alignment with the outer legs 14 and 15 of the core. A member 25 having a sleeve portion 26 is centrally secured to the armature 22 by the rivets 27. The sleeve 26 forms a bearing for rotatably mounting the armature on the shaft 19.

A bracket 29 is secured by a rivet 30 to the upper end of the outer leg 14 of the core. The bracket 29 is provided with a screw threaded opening for receiving a screw 31. The extension 23 of the armature carries a bracket 32 by means of a rivet 33, the bracket 32 having a recess in alignment with the screw 31. A compression spring 34 is interposed between the recess in the bracket 32 and the screw 31 in the bracket 29 for biasing the armature 22 in a clock-wise direction as illustrated in Fig. 3. In other words, the spring 34 resiliently urges the extensions 23 and 24 of the armature away from the outer legs 14 and 15 of the core. A stop member 35 is secured to the outer leg 15 of the core by one of the rivets 12 and this stop member extends upwardly into the path movement of the extension 24 of the armature 22. A screw 36 received in one of the rivets 12 adjustably positions the stop member 35. The stop member 35 operates to limit the extent of clock-wise rotation of the armature as illustrated in Fig. 3. As the coil 16 is intermittently energized, the armature 22 is oscillated about the shaft 19 between a position where it is stopped by the stop member 35 and a position wherein the extensions 23 and 24 substantially engage the outer legs 14 and 15 of the core.

A cup shaped member 38 is secured to the shaft 19 such as by a pin 39 and it prevents longitudinal movement of the shaft in the other direction. The cup shaped member 38 overlies the sleeve 26 and is spaced outwardly therefrom. An over-riding clutch is interposed between the sleeve 26 and the cup shaped member 38, this over-riding clutch being illustrated in more detail in Figs. 2 and 5. It includes a central member 40 which is suitably secured to the sleeve 26 so as to be oscillated thereby. The center member 40 is provided with cam surfaces 41. Interposed between the cam surfaces 41 and the cup shaped member 38 are rollers 42 which are biased in a counter-clockwise direction, as illustrated in Fig. 5 by means of springs 43. As the center member 40 is moved in a counter-clockwise direction, as illustrated in Fig. 5, the rollers 42 are forced outwardly into engagement with the cup shaped member 38 so as to rotate the cup shaped member 38 in that same counter-clockwise direction. When, however, the center member 40 is moved in a clockwise direction the springs 43 move the rollers 42 out of engagement with the cup shaped member 38 so that no clockwise rotation is imparted to the cup shaped member. Accordingly, as the sleeve 26 and hence the center member 40 are oscillated by the armature 22, the cup shaped member is intermittently driven in a counter-clockwise direction as illustrated in Figs. 3 and 5. The over-riding clutch therefore operates positively to drive the shaft 19 in one direction as the armature 22 is oscillated.

The bracket 29 carried by the stationary part of the motor, namely the outer leg 14 of the core, is provided with a slightly curved extension 45 which engages the outer surfaces of the cup shaped member 38. This extension 45 permits free counter-clockwise rotation of the cup shaped member 38 but prevents clockwise rotation of the cup shaped member by digging into the same, if the cup shaped member tends to rotate in a clockwise direction. This extension 45 therefore forms an over-riding clutch which is interposed between the stationary part of the motor and the cup shaped member 38 for positively preventing rotation of the shaft 19 in the opposite or clockwise direction.

An insulating block 48 is secured to the outer leg 15 of the core by the rivets 12 and the insulating block carries a pair of spring arms 49 and 50 having normally engaged contacts 51 and 52. The spring arm 49 is extended across the top of the outer leg 15 of the core to be engaged by a bracket 53 secured to the extension 24 of the armature by a rivet 54. When the armature is retracted by the spring 34, the contacts 51 and 52 are in engagement, but when the armature 24 is attracted by the core upon energization of the coil, the bracket 53 engages the spring arm 49 to separate the contacts 51 and 52. Thus, the spring arms 49 and 50 and their contacts 51 and 52 form an interrupter switch for controlling the electric current applied to the coil 16. The spring arm 52 may be connected to one terminal of a direct current source by a wire 56 and the spring arm 49 is connected by a wire 57 to one end of the coil 16. The other end of the coil 16 is connected by a wire 58 to the other terminal of the direct current source. Accordingly, in the arrangement illustrated in Figs. 1 and 2 direct current is supplied to the coil 16 and the interrupter switch operated by the armature upon oscillation thereof acts to apply a pulsating direct current to the coil to cause the armature to oscillate.

By adjusting the spring 34 and the stop member 35 the extent of oscillation of the armature may be regulated and hence the speed of rotation of the shaft. The extent of oscillation of the armature may also be regulated by adjusting the timing of the opening and closing of the contacts 51 and 52. However, for any given adjustment the shaft will be operated at substantially a constant speed since the armature will be oscillated at substantially a fixed frequency.

Fig. 6 illustrates an arrangement wherein the slow speed electric motor of this invention is energized directly by an A. C. current through wires 60 and 61 leading from a source of A. C. current (not shown). Quite satisfactory results are obtained by energizing the coil 16 of the electro-magnet by alternating current. However, it is found that somewhat improved results are obtained if the coil is energized by a pulsating current rather than by an alternating current.

Fig. 7 illustrates one way of converting the alternating current to a pulsating current for application to the coil 16. Here, a half-wave rectifier 62 may be interposed in the electrical connection 60 for this purpose.

Fig. 8 illustrates another way of converting the alternating current to a pulsating current for application to the coil 16 of the electro-magnet. Here, an electro-mechanical device having a coil 63 and an armature 64 for operating an interrupter switch 65 is utilized. The circuit to the coil 16 of the electric motor extends through the armature 64 and the interrupter switch 65 and the operating coil 63 is connected across the alternating current lines 60 and 61. In this way, the interrupter switch 65 is operated in synchronism with the frequency of the alternating current and operates synchronously to interrupt the current to the coil 16 of the electric motor whereby the current supplied to the electric motor is a pulsating direct current.

By reason of this invention, the motor shaft may be driven at a very slow speed even though the motor is energized by a pulsating current pulsating at a rapid frequency. Good torque is obtained and frictional losses are maintained at a minimum since no gear reduction is required. The device is simple in construction and is inexpensive to manufacture. A substantially constant speed of rotation of the shaft is obtained and the speed may be regulated as desired.

While for purposes of illustration, one form of this invention has been disclosed, other forms may become apparent to those skilled in the art upon reference to this disclosure and therefore this invention is to be limited only by the scope of the appended claims.

I claim as my invention:

1. A slow speed electric motor comprising, an electro-magnet including an E-shaped core having an inner leg and a pair of outer legs and a coil encompassing the inner leg, a rotary shaft rotatably mounted in the inner leg of the core, a pivoted armature mounted for oscillation on said rotary shaft and magnetically coupled to the inner and outer legs of said core and oscillated thereby as said coil is energized, means including an over-riding clutch interposed between said armature and said shaft for positively rotating the shaft in one direction as the armature oscillates, means including an over-riding clutch interposed between said shaft and said core for positively preventing rotation of the shaft in the opposite direction, and means including electrical connections for the coil for applying a pulsating current thereto to cause said armature to oscillate.

2. A slow speed electric motor comprising, a stationary part including an electro-magnet, a pivoted armature magnetically coupled to said electro-magnet and oscillated thereby about its pivot in one direction, a spring interposed between the stationary part and the armature for oscillating the armature about its pivot in the opposite direction, a stop carried by the stationary part and engaged by the armature to limit the movement of said armature in said opposite direction, a rotary shaft, means including an over-riding clutch interposed between said armature and said shaft for positively rotating the shaft in one direction as the armature oscillates, means including an over-riding clutch interposed between said shaft and said stationary part for positively preventing rotation of the shaft in the opposite direction, means including electrical connections for the electro-magnet for applying a pulsating current to said electro-magnet to cause said armature to oscillate and, hence, said shaft to rotate, and adjustable mounting means for said spring and said stop for adjusting the amount of oscillation of said armature for regulating the speed of rotation of said shaft.

3. A slow speed electric motor comprising, a stationary part including an electro-magnet, a rotary shaft carried by the stationary part, a pivoted armature mounted for oscillation on said rotary shaft and magnetically coupled to said electro-magnet and oscillated thereby about the shaft in one direction, a spring interposed between the stationary part and the armature for oscillating the armature about the shaft in the opposite direction, a stop carried by the stationary part and engaged by the armature to limit the movement of said armature in said opposite direction, means including an over-riding clutch interposed between said armature and said shaft for positively rotating the shaft in one direction as the armature oscillates, means including an over-riding clutch interposed between said shaft and said stationary part for positively preventing rotation of the shaft in the opposite direction, means including electrical connections for the electromagnet for applying a pulsating current to said electromagnet to cause said armature to oscillate and, hence, said shaft to rotate, and adjustable mounting means for said spring and said stop for adjusting the amount of oscillation of said armature for regulating the speed of rotation of said shaft.

4. A slow speed electric motor comprising, an electromagnet including an E-shaped core having an inner leg and a pair of outer legs and a coil encompassing the inner leg, a rotary shaft rotatably mounted in the inner leg of the core, a pivoted armature mounted for oscillation on said rotary shaft and magnetically coupled to the inner and outer legs of said core and oscillated thereby about the shaft in one direction as said coil is energized, a spring interposed between one of the outer legs of the core and the armature for oscillating the armature about the shaft in the opposite direction, a stop carried by one of the outer legs of the core and engaged by the armature in said opposite direction, means including an over-riding clutch interposed between said armature and said shaft for positively rotating the shaft in one direction as the armature oscillates, means including an over-riding clutch interposed between said shaft and said core for positively preventing rotation of the shaft in the opposite direction, means including electrical connections for the coil for applying a pulsating current thereto to cause said armature to oscillate, and, hence, said shaft to rotate, and adjustable mounting means for said spring and said stop for adjusting the amount of oscillation of said armature for regulating the speed of rotation of said shaft.

References Cited in the file of this patent

UNITED STATES PATENTS

| | | |
|---|---|---|
| 1,131,896 | Ballman | Mar. 16, 1915 |
| 1,733,872 | Graseby | Oct. 29, 1929 |
| 1,739,885 | Zbinden | Dec. 17, 1929 |
| 2,183,062 | Conrad | Dec. 12, 1939 |
| 2,487,469 | Nelson | Nov. 8, 1949 |
| 2,499,632 | Coake | Mar. 7, 1950 |
| 2,568,757 | Mesh | Sept. 25, 1951 |
| 2,601,174 | Smith | June 17, 1952 |